2,887,486
THEOPHYLLINE DERIVATIVES

Norman H. Leake and Marvel L. Fielden, Bristol, Tenn., assignors to The S. E. Massengill Company, Bristol, Tenn., a corporation of Tennessee No Drawing. Application October 29, 1956
Serial No. 618,671

14 Claims. (Cl. 260—253)

This invention relates to new compounds which are derivatives of theophylline or 1,3-dimethyl xanthine.

The object of this invention is to provide novel 7- and 8-substituted theophylline derivatives.

Still another object is to provide new theophylline derivatives which are characterized by marked therapeutic activity.

Other objects and advantages of our invention will become obvious from the following detailed description.

The new compounds of our invention are 7-dialkyl-aminoalkyl theophylline derivatives having the following structural formulae:

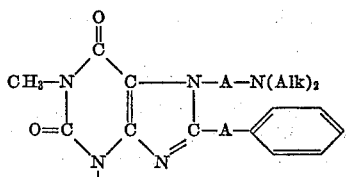

and

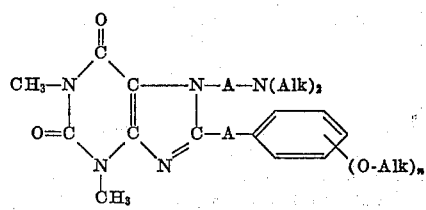

wherein A is lower alkylene, Alk is lower alkyl, and $n$ is an integer which is at least 1. The alkyl and alkylene groups can be the same or different. Our invention also includes the acid salts and the quaternary ammonium derivatives of the aforedescribed dialkylaminoalkyl compounds. The alkylene and alkyl groups, which comprise up to 6 carbon atoms, can be straight or branched chain and will be so construed in this specification and claims.

The free base compounds are generally water insoluble, relatively low melting solids at ordinary temperatures. They form salts both with inorganic acids, such as HCl, HBr, $H_2SO_4$ and $HNO_3$, and with organic acids, such as acetic, propionic, maleic, fumaric, tartaric, citric, benzoic and salicylic acid, which generally are crystalline solids and substantially water-soluble. The physical characteristics of many of the acid salts in terms of their higher melting points and superior water solubility makes them highly advantageous for use in many instances where these characteristics are desirable.

The acid salts can be prepared by addition of the acid to a solution of the free base parent compound or by employing the particular acid salt of the dialkylamino-alkyl reagent, such as the dialkylaminoalkyl halide, used in the preparation of the theophylline derivative.

The quaternary ammonium derivatives can similarly be prepared by reacting the free base theophylline compound with an organic sulfate, nitrate or halide, such as the chloride, bromide or iodide, and the like, or by employing a quaternary ammonium alkyl halide in the preparation of the theophylline derivative. The quaternary ammonium derivatives are advantageous because of their generally higher melting points and water solubility.

EXAMPLE I 8-benzyl-7-(β-diethylaminoethyl)-theophylline hydrochloride 8-benzyltheophylline (5.4 g., 0.02 mol) was dissolved in 40 ml. 1 N sodium hydroxide, and to this solution was added 3.4 gm. (0.04 mol) β-diethylaminoethylchloride hydrochloride. The resulting mixture was heated at reflux for 39 hours, acidified and filtered from unreacted 8-benzyltheophylline. The filtrate was made alkaline and extracted with ether. The dried ether solution was evaporated. The residue (free base) was dissolved in ethanol and treated with concentrated hydrochloric acid. The resulting white crystalline solid was filtered and recrystallized from isopropanol. It melted at 208–10° C., and contained 8.86% chlorine as determined by titration with standard silver nitrate (calc. 8.76%).

EXAMPLE II 8-benzyl-7-(β-diethylaminoethyl)-theophylline methyl bromide 8-benzyl-7-(β-diethylaminoethyl)-theophylline hydrochloride (5.3 g.) was dissolved in 50 ml. of water and treated with sodium bicarbonate. The free base was extracted with ether. The ether solution was dried and the ether then evaporated. The dry, oily solid, free base was treated with methyl-bromide (2.5 g.) in anhydrous ethanol solution in a closed system at 100° C. for 3 hours. The crude solid, weighing 5.5 g. (91.5% yield), was recrystallized from isopropanol containing a small amount of water. The resulting product was a white crystalline solid melting at 334–40° C., and containing 16.8% bromine.

EXAMPLE III 8-benzyl-7-(β-dimethylaminoisopropyl)-theophylline hydrochloride This compound was obtained from 8-benzyltheophylline and 2-chloro-N,N-dimethylpropylamine hydrochloride on a three-hundredths molar scale using the same procedure as that used in Example I. It melted at 239–42° C.

EXAMPLE IV 8-benzyl-7-(γ-dimethylaminopropyl)-theophylline hydrochloride

This compound was obtained from 8-benzyltheophylline and γ-dimethylaminopropylchloride hydrochloride on the same scale and by the same procedure as employed in Example I. It melted at 240–4° C.

EXAMPLE V 7-(β-diethylaminoethyl)-8-(3,4-dimethoxybenzyl)-theophylline hydrochloride This compound was obtained by same procedure as that employed in Example I from 8-(3,4-dimethoxybenzyl)-theophylline and β-diethylaminoethylchloride hydrochloride. It melted at 182–5° C.

EXAMPLE VI

7-β-(diethylaminoethyl)-8-(α-ethylbenzyl)-theophylline hydrochloride

This compound was prepared from 8-(α-ethylbenzyl)-theophylline and β-diethylaminoethylchloride hydrochloride in the same manner as that employed in Example I. It melted at 230–5° C.

The 8-(α-ethylbenzyl)-theophylline was prepared by heating mixture of 8.4 g. 5,6-diamino-1,3-dimethyluracil and 9.9 g. α-phenylbutyric acid at 120° for 1½ hours. The resulting solid was dissolved in sodium hydroxide, the solution filtered, and the product precipitated by passing gaseous $CO_2$ through the solution. It was recrystallized from 67% acetic acid; M.P. 202–3°.

EXAMPLE VII 8-benzyl-7-(β-dimethylaminoisopropyl)-theophylline was prepared by dissolving 0.5 g. of the hydrochloride (see Example III above) in 5 ml. cold water and the resulting solution slowly treated with 10% sodium carbonate solution until no more precipitation took place. The solid was filtered off, washed well with water and dried. The resulting free base compound was a white crystalline solid, M.P. 124–7° C., which is insoluble in water and soluble in alcohol and other organic solvents.

EXAMPLE VIII 8-benzyl-7-(γ-dimethylaminopropyl)-theophylline was prepared from its hydrochloride by the procedure described in Example VII. The white, crystalline, free base compound has a melting point of 85–8° C. and is insoluble in water and soluble in alcohol and other organic solvents.

EXAMPLE IX 7-(β-diethylaminoethyl)-8-(3,4-dimethoxybenzyl)-theophylline was prepared from its hydrochloride by the procedure described in Example VII. The white, crystalline, free base compound has a melting point of 68–70° C. and is insoluble in water and soluble in alcohol and other organic solvents.

EXAMPLE X 8-(3,4-diethoxybenzyl)-7-(β-diethylaminoethyl)-theophylline hydrochloride was prepared from 3.6 gm. 8-(3,4-diethoxybenzyl)-theophylline and 1.7 gm. β-diethylaminoethylchloride hydrochloride by the same procedure as that described in Example I. After recrystallization from isopropanol, and then ethyl acetate, the white solid product weighed 2.2 gm. and melted at 177–80° C. It is soluble in water.

The free base, which was prepared from the HCl salt as described in Example VII, had a melting point of 115–8° C.

EXAMPLE XI 7-(β-diethylaminoethyl)-8-(4-ethoxy-3-methoxybenzyl)-theophylline hydrochloride was prepared from 3.5 gm. 8-(4-ethoxy-3-methoxybenzyl)-theophylline and 1.7 gm. β-diethylaminoethylchloride hydrochloride by the procedure used in Example I. The white water soluble hydrochloride weighed 1.5 gm. and melted at 221–2° C.

The free base, which was prepared from the HCl salt as described in Example VII, had a melting point of 120–1° C.

EXAMPLE XII

*8-(3,4-dimethoxybenzyl)-7-(β-diethylaminoethyl)-theophylline propargylbromide*

A solution containing 0.45 gm. 7-(β-diethylaminoethyl)-8-(3,4-dimethoxybenzyl)-theophylline, 1.5 gm. propargylbromide and anhydrous ethanol was heated at reflux for 4 hours. Ether was added until precipitation of a solid began and the solution was cooled. The white, crystalline solid was filtered, washed with ether and dried. It weighed 0.5 gm. and melted at 108–10° C.

EXAMPLE XIII

*8-benzyl-7-(β-dimethylaminoisopropyl)-theophylline benzylchloride*

A solution of 0.45 gm. 8-benzyl-7-(β-dimethylaminoisopropyl)-theophylline, 1.1 gm. benzylchloride and 10 ml. anhydrous ethanol was heated at reflux for 4 hours.

The product was isolated in the same way as that of Example XII. It was a white water soluble crystalline solid weighing 0.3 gm., and melted at 196–200° C.

EXAMPLE XIV 7-(β-diethylaminoethyl)-8-(3,4,5-trimethoxybenzyl)-theophylline hydrochloride was prepared by the procedure of Example I using 3.6 gm. 8-(3,4,5-trimethoxybenzyl)-theophylline and 1.7 gm. β-diethylaminoethylchloride hydrochloride. The white, water soluble crystalline product weighed 3.2 gm. and melted at 240–2° C.

The free base, which was prepared from the HCl salt as described in Example VII, had a melting point of 131–2° C.

EXAMPLE XV

*7-(β-diethylaminoethyl)-8-(p-methoxybenzyl)-theophylline and its hydrochloride*

Procedure of Example I was used with 3.0 gm. 8-(p-methoxybenzyl)-theophylline and 1.7 gm. β-diethylaminoethylchloride hydrochloride. The free base was an oil. The hydrochloride weighed 3.6 gm. and melted at 258–60° C.

EXAMPLE XVI 7-(β-diethylaminoethyl)-8-(4-ethoxy-3-methoxybenzyl)-theophylline fumarate was prepared by treating an ethanol solution of the free base compound with fumaric acid. The salt had a melting point of 153–5° C.

EXAMPLE XVII 7-(β-diethylaminoethyl)-8-(3,4,5-trimethoxybenzyl)-theophylline benzoate was prepared by treating an ethanol solution of the free base compound with benzoic acid. The salt had a melting point of 131–3° C.

The compounds are therapeutically active as, for example, in reducing arterial blood pressure. In some cases they show marked antihistaminic activity.

EXAMPLE XVIII

Experimental animals were anesthetized with pentobarbital and prepared for measurement of carotid arterial pressure, which was recorded kymographically. The experimental compounds were given intravenously, orally or intraperitoneally. Changes and duration of changes in blood pressure were noted. Results are indicated in the following table.

Table

| Compound | Test Animal | Dosage, mg./kg. | Route | Blood Pressure | | |
|---|---|---|---|---|---|---|
| | | | | Normal | After Drug | Duration of Action |
| #53[a] | rabbit | 5 | i.v. | 100 | 70 | 3 min. |
| | do | 10 | i.v. | 100 | 70 | 8 hrs. |
| | rat | 5 | i.p. | 136 | 118 | 45 min. |
| | do | 10 | i.p. | 130 | 94 | 60 min. |
| | dog | 5 | i.p. | 120 | 100 | 30 min. |
| | do | 5 | i.p. | 120 | 120 | |
| | do | 10 | i.v. | 120 | 60 | 20 min. |
| | do | 10 | i.v. | 120 | 80 | 4 hrs. |
| #49[b] | rabbit | 5 | i.v. | 100 | 50 | 3 min. |
| #50[c] | do | 5 | i.v. | 105 | 65 | 30 secs. |
| #51[d] | do | 10 | oral | 80 | 60 | |
| | dog | 5 | i.v. | 130 | 50 | |
| #48[e] | rabbit | 25 | oral | 100 | 60 | 2 hrs. |
| | do | 50 | oral | 105 | 80 | 2 hrs. |
| | rat | 5 | i.v. | *140 | 125 | 2 hrs. |
| | do | 10 | i.v. | *140 | 120 | 2 hrs. |
| | do | 20 | i.v. | *140 | 94 | 2 hrs. |
| | dog | 5 | i.p. | 120 | 120 | |
| | do | 50 | oral | 120 | 72 | 4 hrs. |
| | do | 50 | oral | 130 | 70 | 5 hrs. |

*Rats slightly hypertensive due to age.
[a] 7-(β-diethylaminoethyl)-8-(3,4-dimethoxybenzyl)-theophylline hydrochloride.
[b] 8-benzyl-7-(β-diethylaminoethyl)-theophylline methyl bromide.
[c] 8-benzyl-7-(β-dimethylaminoisopropyl)-theophylline hydrochloride.
[d] 8-benzyl-7-(γ-dimethylaminopropyl)-theophylline hydrochloride.
[e] 8-benzyl-7-(β-diethylaminoethyl)-theophylline hydrochloride.

EXAMPLE XIX

To determine antihistaminic activity, rats or guinea pigs were treated with the drug, intravenously or intraperitoneally, and then challenged with histamine diphosphate intravenously at 0.4 mg./kg. Active compounds prevent the normal blood pressure lowering response to histamine and death.

| Compound | Minimum effective dose, Mg./kg. | Route |
|---|---|---|
| 8-Benzyl-7-(β-diethylaminoethyl)-theophylline methyl bromide | 10 | i.v. |
| Do | 10 | i.p. (after 30 min.) |
| Theophylline (as aminophylline) | Inactive up to 100 mg./kg. | i.v. |
| Venadryl | 10 | i.v. |

Toxicity of the compounds is relatively low as shown by the acute $LD_{50}$ given in the following table. The animals employed were rats and the drug was administered intravenously.

Compound: $LD_{50}$, mg./kg.
7-β-diethylaminoethyl-8-benzyl-theophylline HCl _____ 35
8-benzyl-7-β-diethylaminoethyltheophylline methyl bromide _____ 10
8-benzyl-7-β-dimethylaminoisopropyl theophylline HCl _____ 50
7-β-diethylaminoethyl-8-(3,4-dimethoxylbenzyl)-HCl _____ 100

The compounds can be administered in any desired manner. Where an aqueous vehicle is to be used, it is, of course, desirable to employ the more water-soluble derivatives, namely the acid salts or quaternary ammonium derivatives. The compounds can also be carried in solution in an organic solvent, such as ethanol, or in admixture with a suitable, non-toxic, solid vehicle such as starch, milk sugar, bentonite and the like.

Although this invention has been described with reference to illustrative embodiments thereof, it will be apparent to those skilled in the art that the principles of this invention may be embodied in other forms but within the scope of the claims.

We claim:

1. Compounds selected from the group consisting of 7-di-(lower-alkyl)-amino-(lower-alkyl)-theophylline having an 8-substituent selected from the group consisting of phenyl-(lower-alkyl) and (lower-alkoxy)-phenyl-(lower-alkyl), their acid salts and their quaternary ammonium salts selected from the group consisting of lower-alkyl, lower alkinyl and phenyl-lower-alkyl quaternary ammonium salts.

2. The HCl salts of the compounds of claim 3.

3. 7-di-(lower-alkyl)-amino-(lower-alkyl) - 8 - phenyl-(lower alkyl)-theophylline.

4. The acid salts of the compounds of claim 3.

5. 7-di-(lower-alkyl)-amino-(lower-alkyl)-8-(lower-alkoxy)-phenyl-(lower-alkyl)-theophylline.

6. The acid salts of the compounds of claim 5.

7. The acid salts of 8-benzyl-7-(β-diethylaminoethyl)-theophylline.

8. 8-benzyl-7-(β-diethylaminoethyl)-theophylline hydrochloride.

9. The acid salts of 7-(β-diethylaminoethyl)-8-(3,4-dimethoxybenzyl)-theophylline.

10. 7-(β-diethylaminoethyl)-8-(3,4-dimethoxybenzyl)-theophylline hydrochloride.

11. 7-di-(lower-alkyl)-amino-(lower-alkyl) - 8 - (poly-lower-alkoxy)-phenyl-(lower-alkyl)-theophylline.

12. The acid salts of the compounds of claim 11.

13. The lower-alkyl quaternary ammonium derivatives of the compounds of claim 3.

14. The HCl salts of the compounds of claim 5.

References Cited in the file of this patent

UNITED STATES PATENTS

| | | |
|---|---|---|
| 2,641,598 | Moussalli et al. | June 9, 1953 |
| 2,799,675 | Erhart et al. | July 16, 1957 |

OTHER REFERENCES

Hager et al.: Journal of the American Pharmaceutical Association, vol. 43, pp. 36–39 (1953).

Hildebrandt: Chemical Abstracts, vol. 46, p. 2689c (1952); as abstracted from: Deutsche Medizinische Wochenschrift, vol. 77, pp. 13–15 (1952).

Quevauviller et al.: Annales Pharmaceutiques Francaises (1949), pp. 32–39.